FIP8102 XR 3,328,696

R5273N (2)

June 27, 1967 R. SCHÜNEMANN 3,328,696

TRANSMITTER PROTECTIVE CIRCUIT WITH PRESET PERMISSIBLE NUMBER OF FAULTS AND ADJUSTABLE INTERRUPTION DURATION

Filed April 25, 1963

INVENTOR.
Rüdiger Schünemann

BY

June 27, 1967 R. SCHÜNEMANN 3,328,696

TRANSMITTER PROTECTIVE CIRCUIT WITH PRESET PERMISSIBLE NUMBER OF FAULTS AND ADJUSTABLE INTERRUPTION DURATION

Filed April 25, 1963

4 Sheets-Sheet 3

United States Patent Office 3,328,696
Patented June 27, 1967

3,328,696

TRANSMITTER PROTECTIVE CIRCUIT WITH PRESET PERMISSIBLE NUMBER OF FAULTS AND ADJUSTABLE INTERRUPTION DURATION

Rüdiger Schünemann, Berlin-Halensee, Germany, assignor to Siemens & Halske Aktiengesellschaft, Berlin and Munich, a corporation of Germany Filed Apr. 25, 1963, Ser. No. 275,775
Claims priority, application Germany, Apr. 26, 1962, S 79,180
10 Claims. (Cl. 325—151)

The invention disclosed herein is concerned with an improved transmitter protection or safety circuit arrangement. The operation of transmitters, especially high power transmitters, requires for the continuous supervision of operating conditions a number of devices and measures. Conditions which deviate from normal operations, for example, tube failures or faulty matching of the transmitter output to the antenna, must be instantly signalled or automatically corrected as quickly as possible.

For example, in order to protect a transmitter tube against destruction due to a shunt, the anode-and screen grid voltage of the tube must be instantly disconnected so that to extinguish the resulting arc. The transmitter operation need to be interrupted only briefly. The disconnected voltages can be reconnected after about 0.1 sec. to 0.5 sec. In case the tube shunt recurs several times, for example, within an interval of one minute, a further measure will be measured for preventing the automatic reconnection of the anode- and screen grid voltage.

It is known to use relay circuits for the realization of such or similar safety arrangements for transmitter systems, which include in the indicated example a reconnection device, a counting device and a blocking device. These safety circuits are also used for the brief disconnection of the operating voltages in the case of faulty matching of a transmitter.

Aside from the great expenditure for relays, circuit protectors and switches, required for producing safety circuits for a plurality of interrelated functions, there must also be considered the fact that the reliability of operation is adversely affected, depending upon the number of electrical contacts which are vulnerable owing to external influences such as moisture, contamination, chemical alteration of the contact points, and the like.

The object underlying the invention is to provide for the functions of reconnection, counting and blocking, for the supervision of tube failures or faulty matching, a circuit which overcomes the drawbacks of known relay circuits.

According to the invention, this object is realized by the provision of transmitter safety or protection circuit employing groups of active and passive components operating without contacts, for example, transistors and diodes which are triggered by signals; said safety circuit producing, responive to a brief interruption of the anode- and screen grid voltage, initiated by a signal alteration, at the output of a signal reversal stage, in a timing stage, a control signal of adjustable duration, which determines the interruption interval; such signal being released by the operation of a further reversal stage carrying at its output, during the interruption interval, a null signal; said control signal obtained at the output of the timing stage triggering, for the blocking of the operating voltages, a binary stage which effects reversal of various signals (control signal, null signal) carried at its two outputs, one of these outputs or, respectively, alternately one of its outputs, extending to an input of one (or more) step-by-step counters; the output carrying the control signal being for the setting of the number of permissible control impulses, for example, tube failures, selectively directly connected, by way of a switch and a memory for storing the control signal, with a control stage which effects the blocking, and being further connected with a second input of the reversal stage which effects the interruption, and over a timing stage which determines for the impulse expansion the duration of the counting operation and a successively disposed amplifier part, with a second input of the first counting stage, the output of which supplies, in the presence of a control signal at the inputs, a control signal which is extended to the input of a further counting stage and over the switch to the input of the memory.

Further details and features of the invention will be brought out in the course of the description which is rendered below with reference to the accompanying drawings.

Figure 1:
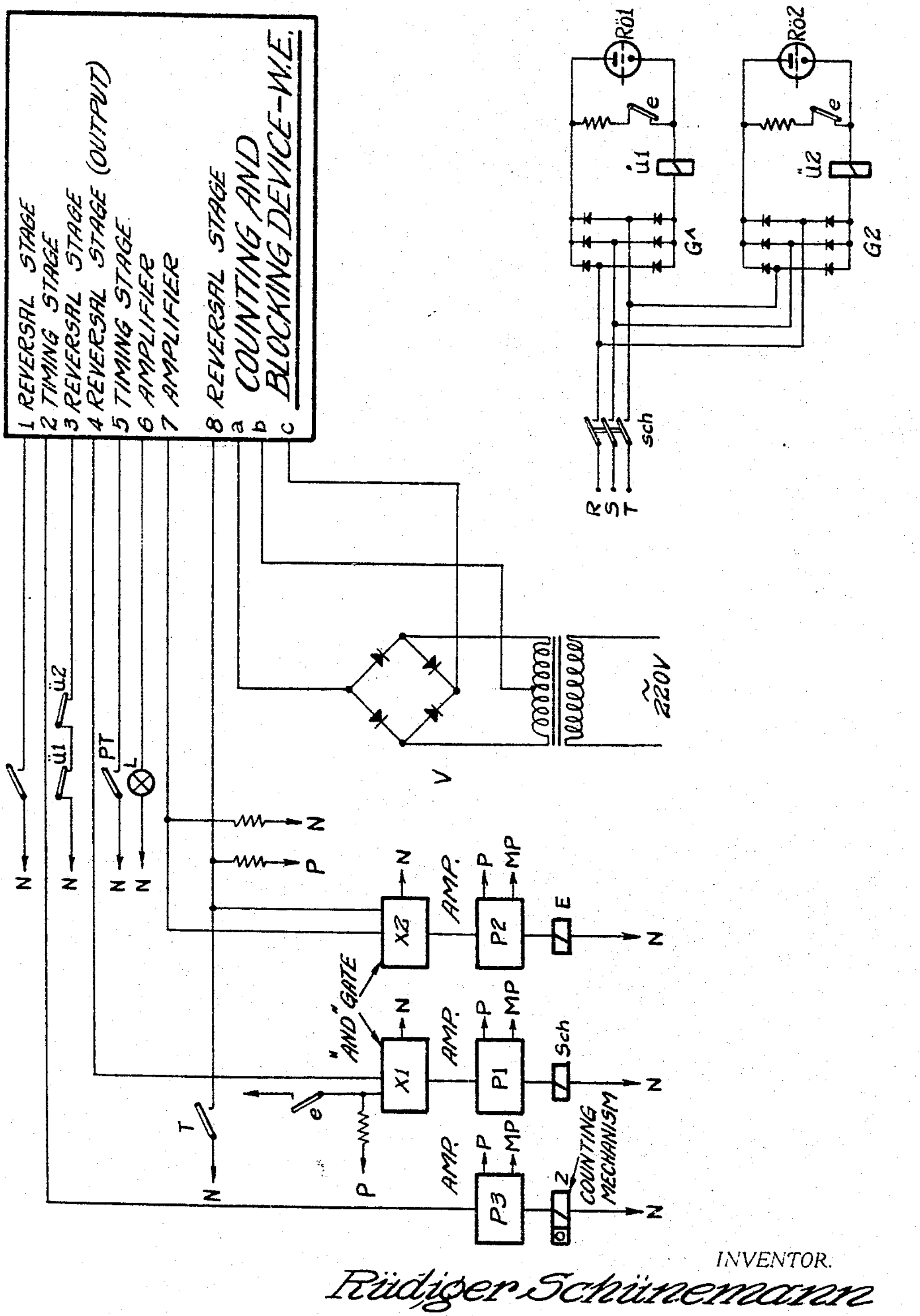
FIG. 1 illustrates in block diagram form the entire protection or safety circuit arrangement for the anode current supply of two transmitter tubes.

The current supply of transmitter is effected from the three-phase network R, S, T over contacts of a power control switching relay *Sch* and over parallel disposed rectifier devices G1 and G2. Only the electrical direct current connections for the anode voltages are indicated in FIG. 1. Overload relays U1, U2 are respectively arranged in the cathode lines of the tubes R*o*1 and R*o*2, such relays controlling respectively the operation of contacts *u*1 and *u*2 indicated in the upper part of FIG. 2. In the event of a shunt in one of the two tubes, the respective relay U1 or U2 will be energized by overload current and the contact *u*1 or *u*2 of the corresponding relay will be opened.

Details of the transmitter circuit arrangement which do not serve for an understanding of the invention have been omitted in FIG. 1. Screen grid tubes may be used in place of the triodes R*o*1 and R*o*2. The individual functions of the safety circuit (power reconnection, failure counting and power blocking) are operatively released responsive to tube failures (shunts) or, over tuning protection means, responsive to mismatching of the transmitter, thereby initiating by the action of the power control switch *Sch* a brief or as the case may be, a prolonged interruption of the current supply.

As shown in FIG. 1, the safety circuit arrangement comprises the reconnection-, counting- and blocking device WE, the power supply V, and a plurality of auxiliary devices for the disconnection of the operating voltages. The current supply V delivers at its terminals N, MP and P the operating voltages required for the entire control device which effects in the form of signals the triggering of all switching or circuit elements. The output P carries a voltage which is positive with respect to the output MP, for example, +24 volts, the ground potential on MP being referred to as the null signal. The output N carries a voltage which is negative with respect to the output MP, for example, −24 volts, which voltage is hereinafter referred to as control signal.

The respective input and output terminals of the reconnection- counting- and blocking device WE are indicated by the numerals 1 to 8 and by characters *a*, *b*, *c*. The terminal 3 is to be considered as the main input, such terminal being connected with the break contacts *u*1, *u*2, controlled respectively by the overload relays U1, U2, and over these contacts with the output N (control signal) of the current supply V. The terminal 3 carries the control signal so long as the contacts *u*1 and *u*2 are closed. Over the terminals 4 and 7 is effected the connection of the anode- or screen grid voltage and the blocking thereof, respectively.

The main switch T is to be actuated after operative connection of the current supply V, so as to effect the connection of the anode- or screen grid voltage to the transmitter tubes, thereby placing the control signal on the terminal 8. The connection of the current supply causes appearance of the control signal at the terminals 4 and 7 and therewith on an input of the respective And-gates X1 and X2. The second input of the respective And-gates receives control signal already upon closure of the main switch T. Since control signal is on both inputs of the And-gate X2, the output of such gate will likewise carry control signal which triggers the amplifier P2. The grounding switch E which is disposed in the collector circuit of the amplifier P2, is energized, thereby cancelling the shunt which is required for the rapid discharge of filter chains. Contact *e*, controlled by the switch E, places control signal on the third input of the And-gate X1, causing the actuation of the power control switching relay S*ch* (FIG. 1), thus operatively connecting the anode- or screen grid voltage.

In the event of a tube shunt, one or the other of the contacts *u*1 or *u*2 will be opened. Accordingly, null signal will instantly appear, for a brief adjustable interval from 0.1 to 0.5 sec., at the terminal 4 and therewith at the amplifier P1. The power control relay S*ch* opens its contacts *sch*, disconnecting the operating voltage from the tubes for the duration of this interval. The previous condition is after the brief interruption restored.

In case it should be desired, for example, that not more than six tube failures (shunts) should be permitted within an interval of one minute, a null signal will also appear, at the sixth tube failure, at the terminals 6 and 7 and therewith at the amplifier P2. The power control relays S*ch* and E deenergize. The reconnection of the operating voltage is now blocked so long as the main switch T is not opened and reclosed.

A control lamp L may be connected to the terminal 6 of the reconnection-, counting- and blocking device, such lamp lighting up incident to the blocking operation.

Over the terminal 1 may be extended control signal impulses from another safety device, for example, a tuning protection device, which impulses are after a given number of tuning failures, likewise operative to effect the blocking of the operating voltages.

To the terminal 2 may be connected a counting mechanism Z, over the amplifier P3, for counting all interruptions of the overload current loop of the tubes.

The function of all stages may be tested upon connecting a control signal over the testing key PT to the terminal 5, FIG. 1, since all stages except the stage NI, NII (FIG. 2) operate exactly as in the case of a tube shunt.

Figure 2:
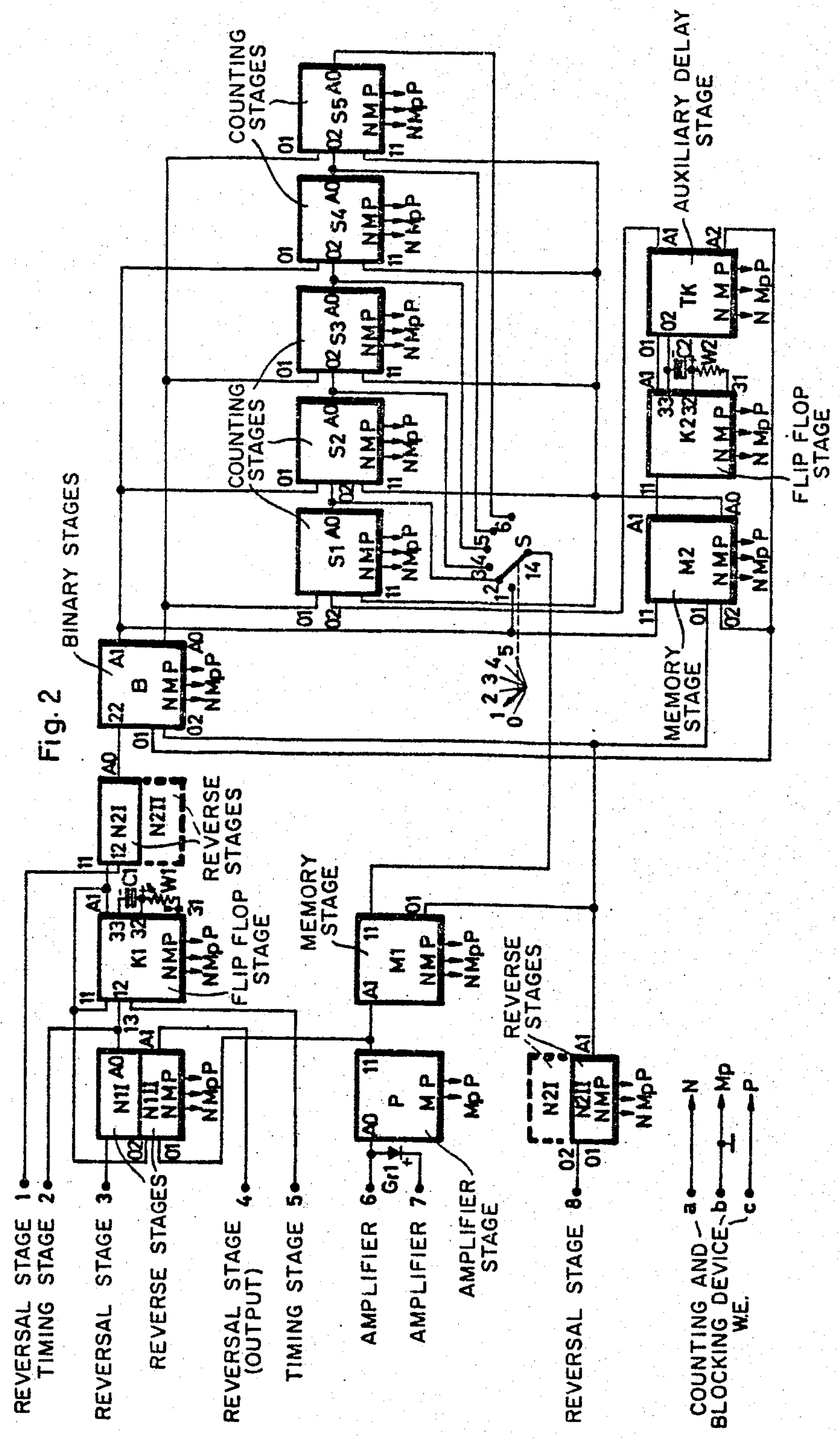
FIG. 2 represents in block diagram form the reconnection-counting- and blocking device.

The reconnection-, counting- and blocking device WE comprises, as shown in FIG. 2, a number of groups of components operating without contacts, such as transistors and diodes, which are subject to logical linkings, and triggered by control and null signals, respectively. The entire control operation is based upon a linking of logical basic functions which are respectively independent of time or dependent on time, such functions being executed by the groups of components indicated in the block diagram shown in FIG. 2.

The circuit details of groups of components included in FIG. 2—reversal stage N, flip stage K, binary stage B, counting stages S1 to S5, auxiliary delay stage TK, memories M and amplifier P—are illustrated in FIGS. 3*a* to 3*g*.

The manner in which the functions of the control circuit are realized shall now be explained with reference to FIGS. 3*a* to 3*g*.

Figure 3A:
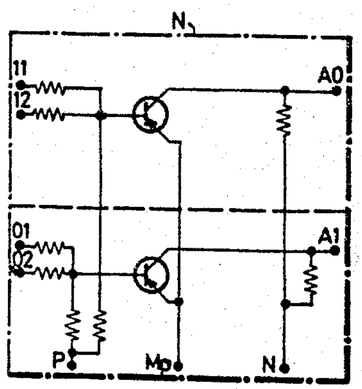
FIGS. 3*a* to 3*g* illustrates more in detail circuits of the component groups employed.

FIG. 3*a* shows a reversal stage N forming a component group combined with an Or-gate. The reversal function requires the inverse input signal at the output A0. Accordingly, the output A0 or A1, respectively, shall carry the control signal when the null signal occurs at the two inputs 11, 12 or 01, 02, respectively, and carries in the presence of a control signal at one of the inputs, the null signal. When the transistor of this circuit is at cutoff, the output A0 or A1 will be over a resistor on the potential N (control signal −24 volts). However, in case there is a control signal at one of the four inputs, a control current will flow over the emitter-base path, the transistor will become conductive and the collector will assume the potential MP, that is, null signal will appear at the output.

The flip or trigger stage K (timing stage, FIG. 3*b*) is based upon a time function. The timing stage shall maintain a signal only for a very definitely adjustable interval. There is used for this purpose a monostable flip-flop with an external RC-circuit. Responsive to null signals at the inputs 11, 12 and 13, the transistor *t*1 becomes conductive, receiving a control current over the resistor R. The output A1 therefore has null signal. The coupling of the base of the transistor *t*1 with the collector of the transistor *t*0 is effected over the capacitor C which is initially not charged. The transistor *t*0 becomes conductive responsive to a control signal (−24 volts) on one of the inputs 11, 12 or 13 and its collector will receive the potential MP (null signal). The potential at the point 32 becomes due to a charge on the capacitor strongly positive with respect to MP, and the transistor is instantly placed at cutoff. Accordingly, a control signal appears at the output A1. The charge on the capacitor C is now changed over the resistor R, corresponding to the voltage on the resistor *ro*, displacing the potential at the point 32 in negative direction, the transistor *t*1 becoming again conductive when this potential is sufficiently negative. The control signal at the output A1 disappears. The duration of the control signal at the output A1 is determined by the capacitance of the capacitor C and the magnitude of the resistor R, and can be selected to last for fractions of a second up to several seconds.

Figure 3B:
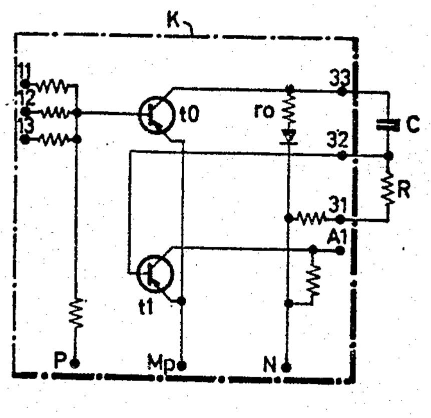
Figure 3C:
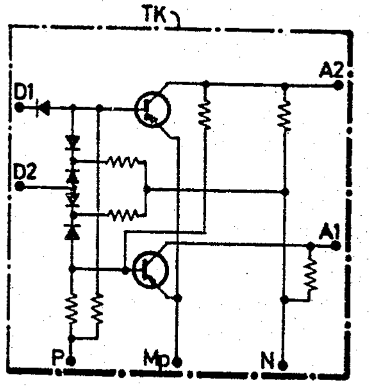
Figure 3D:
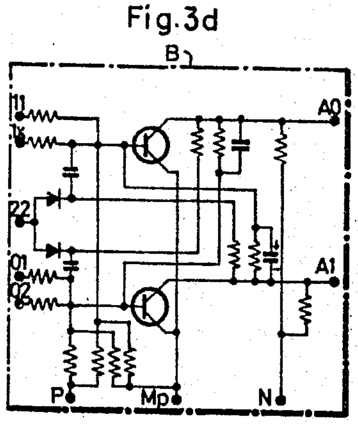
Figure 3E:
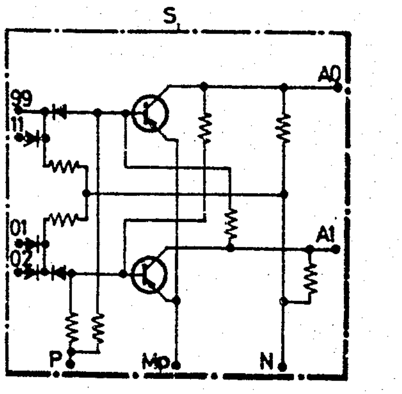
Figure 3F:
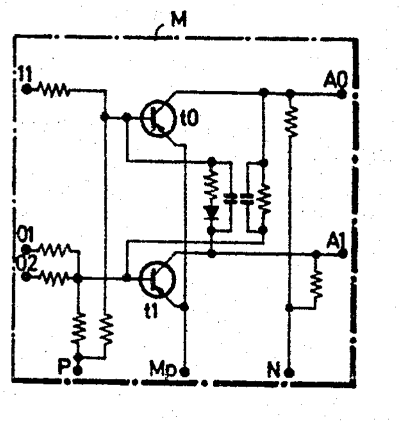
Figure 3G:
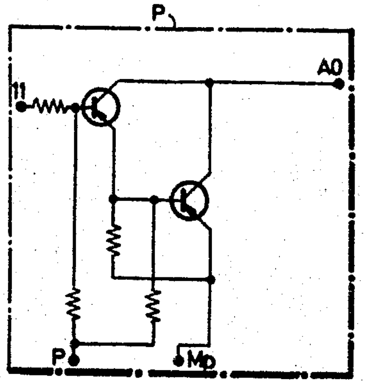

In FIG. 3*c* is shown another form of the timing stage represented by the auxiliary delay stage TK which may be used in combination with the timing flip-flop circuit K of FIG. 3*b*, to produce an adjustable signal delay. Upon connecting the flip-flop circuit K (FIG. 3*b*) with the auxiliary delay stage TK (FIG. 3*c*), a control signal standing at one of the inputs 11 or 12 of the flip-flop circuit K will effect at the output A1 of the auxiliary delay stage TK, a control signal for an interval which is determined by the RC-combination of the flip-flop circuit K. A brief control signal will appear at the output A2 upon disappearance of the control signal at the output A1.

The binary stage B (FIG. 3*d*) reverses the signal at the outputs A1 and A2 (the control signal becomes null and the null signal becomes control signal) responsive to a change, at its input 22, of the control signal to a null signal. A control signal at one of the inputs 01 or 02 produces a control signal at the output A0.

The set S of the counting stage (FIG. 3*e*) comprises an And-gate and an active component group. A control signal at one of two inputs 01 or 02 results in a control signal at the output A0, even upon disappearance of the input signal. Null signal will appear at the output A0 responsive to a control signal at the input 11.

The memory M (FIG. 3*b*) functions as a storer. Appropriate circuit means become operative upon operative connection of the power supply, to make the transistor *t*1 conductive while placing the transistor *t*0 at cutoff. The presumption is that there is no control signal at the input 11. This condition is held since a control signal is at the output A0, control current for the transistor *t*1 being thus supplied over the Or-input. Conversely, a null signal at A1 holds the transistor *t*0 at cutoff. Upon appearance of a control signal at the input 11, the transistor *t*0 will become conductive and the voltage at the output A0 will break down. The control current of the transistor *t*1 disappears and the output A1 will receive control signal. This condition remains stable, even upon disappearance of the input signal at the input 11, and can be deleted only by a control signal at one of the inputs 01 or 02.

The amplifiers, such as the amplifier P (FIG. 3*g*) operate respectively to effect the power amplification required for the actuation of operating elements, for example, the power control relay. The respective amplifier comprises multi-stage transistor amplifiers. The output A0 will carry null signal responsive to appearance of a control signal at the input 11.

The operation of the entire circuit arrangement for the reconnection, counting and blocking functions, will now be described with reference to FIG. 2.

A control signal is upon operative connection of the power supply V (FIG. 1) placed on the input 02 of the pinary stage B (see also FIG. 4*d*) and on the respective inputs 01 of the memories M1 and M2 (see also FIG. 4*f*), along the circuit extending from N2II (botttom left in FIG. 2), thus producing the initial condition. The binary stage B now carries control signal at the output A0 and the counters S1 to S5 (see also FIG. 4*e*) accordingly carry null signal at the respective outputs A0.

The operative connection of the anode- or screen grid voltage of the transmitter tubes R*o*1 and R*o*2 is effected over the main switch T (FIG. 1), such switch placing control signal on the terminal 8 of the reversal stage N2II (bottom left in FIG. 2) so that null signal appears at the output A1 thereof. This control signal is also extended to one output of the respective And-gates X1 and X2 (FIG. 1). Upon energization of one or the other of the overload relay U1 or U2 (FIG. 1) responsive to overload current of a transmitter tube, the break contact *u*1 or *u*2, controlled by the corresponding overload relay, will be opened, and the control signal on the input 11 of the reversal stage N1I (left top in FIG. 2) will disappear. At the output A0 of this reversal stage and therewith also the input 12 of the timing flip-flop circuit K1 will at the same time appear a control signal. At the output A1 of the stage K1 and at the inputs 11 and 02 of the respective reversal stages N2I and N1III (see also FIG. 3*a*) now appears a control signal, for an interval which depends upon the time constant C1, W1, the duration of which is adjustable, for example, between 0.1 sec. to 0.5 sec., by means of the resistor W1 (top left in FIG. 2). This control signal causes a null signal to appear at the output A1 of the reversal stage N1II and therewith also on the terminal 4 (FIG. 1). The "And" condition of the And-gate X1 is thus cancelled, the power control relay S*ch*, connected with the amplifier P1 (FIG. 1), deenergizes, and disconnects the anode- or screen grid voltages of the transmitter tubes. A null signal is by the action of the control pulse at the same time produced at the output A1 of the time flip-flop stage K1 so as to produce a null signal at the output of the reversal stage N2I. This causes at the outputs A1 and A0 of the binary stage B (see also FIG. 3*d*) a signal reversal, that is, the output A1 will carry control signal and the output A0 the null signal. The output A1 is connected with the input 11 of the memory M2, thus producing at such input the control signal. The output A1 of the auxiliary delay stage TK likewise receives by this operation a control signal, for the time interval of, for example, 60 sec., determined by the RC-members W2, C (bottom right of FIG. 2), such control signal being conducted to the input 02 of the counting stage S1.

The overload relay deenergizes, responsive to the disconnection of the voltage from the transmitter tubes, by the power control relay S*ch*, for example, after 40 ms. After the lapse of the time interval which is set with the aid of the resistor W1 of the time flip-flop stage K1, between 100 to 500 ms., there will again appear null signal at the output A1 of the time flip-flop circuit, so that the control signal is again on the output A1 (terminal 4), due to the signal reversal at the reversal stage N1II, thus causing operative reconnection of the power control switch S*ch* (FIG. 2) and therewith reconnection of the operating voltage to the transmitter tubes. The initial condition is in this manner restored.

The operations of the individual stages are repeated as above described, in the event that another tube failure (shunt) occurs within a time interval of 60 sec. Incident to the second impulse which is caused by a tube shunt, a signal reversal is again effected at the outputs of the binary stage B, that is, the output A0 receives control signal and the output A1, null signal. The control signal of the output A0 also appears at the output 01 of the counting stage S1. Since both inputs of the counting stage S1 carry control signal, a control signal will also appear at the output A0 of such stage. This registers the first counting step. Further interruptions of the tube overload loop will in similar manner cause control signals to appear successively at the outputs of the counting stages S2, S3, S4 or S5.

Depending upon the position of the switch S (FIG. 2, right center), either the first tube shunt at the output A1 of the binary stage B, or the control signal standing after further tube shunts at one of the outputs of the counting stages S1 to S5, will be extended to the input of the memory M1 (left center in FIG. 2). The control signal thus stands also at the output A1 of the memory M1 and does not disappear even after disconnecting the voltage from the tubes. The control signal at the output of the memory M1 produces by the signal reversal, null signal at the output A0 (terminal 6, 7) of the amplifier P and at the output A1 of the reversal stage N1II (terminal 4) which is serially disposed with respect to the memory M1. The power control relays S*ch* and E (FIG. 1) deenergize at the same time. The blocking which is thereby effected can be cancelled only upon disconnecting the control signal from the terminal 8, by opening the main switch T. The control signal is then at the output A1 of the reversal stage N2II, causing restoration of the memories M1 and M2 over the inputs 01 thereof and also restoration of the counting stages S1 to S5 over the input 11 of such stages. The anode- or screen grid voltage can be operatively reconnected only after conclusion of these operations, by the closure of the main switch T.

Transmitter protection and safety arrangements of the described kind can be advantageously constructed with the aid of switching or circuit units known under the trade name "Simatic," which excel in respect to operating reliability and short switching times.

Changes may be made within the scope and spirit of the appended claims which define what is believed to be new and desired to have protected by Letters Patent.

I claim:

1. A transmitter safety protection circuit arrangement for providing an interruption interval and a blocking of the voltage to the transmitter tubes, comprising a first and a second phase inverter, a first time flip-flop circuit, means responsive to a transmitter malfunction initiated by a signal change therein for triggering said first phase inverter, said first phase inverter having an output signal produced by the triggering thereof which is connected to said first time flip-flop circuit to produce a definite control signal of adjustable duration at an output thereof, the time duration of said control signal determining the interruption interval of the voltage of the transmitter tubes, said control signal being connected to said second phase inverter to provide a null signal at an output thereof for producing the interruption interval, said null signal being a phase inversion of said control signal, a further phase inverter, a binary divider stage, the control signal obtained at the output of said first time flip-flop circuit being connected to and phase inverted by said further inverter at an output thereof, the output of said further phase inverter being connected to said binary divider stage, said binary divider stage having two outputs carrying respectively a control signal and a null signal, a step-by-step counter having counting stages, respective outputs of said binary divider stage being connected with an input of respective alternate ones of said counting stages, a switch for setting the number of permissible control impulses caused by tube failure, a first memory stage, the outputs of said counting stages being selectively connectible with said first memory stage through said switch, an amplifier, said first memory stage being operative to store said control signal and being connected to said amplifier and to a second input of said second phase inverter, a second time flip-flop circuit, an auxiliary delay stage, one output of said binary divider stage being connected through said second time flip-flop circuit which determines the duration of the counting operation and through said auxiliary delay stage to a second input of a first one of said counting stages, the output of which supplies, in the presence of inputs carrying a control signal, a control signal to the input of a subsequent one of said counting stages and over said switch a control signal to the input of said first memory stage, an output of said amplifier being disposed for blocking the voltage of the transmitter tubes.

2. A circuit arrangement according to claim 1, further comprising a second memory stage, and wherein said auxiliary delay stage is provided with a second output which is connected to an input of said binary divider stage and through one of the inputs of said second memory stage to an input of each counting stage, whereby upon termination of the duration determined by said second time flip-flop circuit, the counting steps of the counting stages are erased and said binary divider stage is restored to its quiescent normal condition by means of a control signal present for a relatively short time over said connection.

3. A circuit arrangement according to claim 1, wherein the output of said second reversal stage is operatively connected with the input of the binary stage and, upon operative connection of the current supply, applied at an input of each counting stage and at an input of said binary stage, by means of which the original condition of such stages is restored.

4. A circuit arrangement according to claim 1, comprising a main switch operatively connected to said second reversal stage, a second memory stage, wherein opening of said main switch responsive to blocking of the tube voltage, causes said second reversal stage to supply a control signal for the restoration of said first named and of said second named memory stages and for the restoration of said counting stages.

5. A circuit arrangement according to claim 1, comprising separate circuits for effecting the brief interruption of the operating voltages responsive to a control signal supplied by said second reversal stage and for effecting the blocking of the operating voltages for the transmitter tubes responsive to a control signal supplied by said power control stage.

6. A circuit arrangement according to claim 5, comprising And-gates over which are respectively effected the control of circuits for the brief interruption and the blocking of the operating voltages for the transmitter tubes.

7. A circuit arrangement according to claim 1, werein said counting stages are also utilized for the evaluation of control pulses produced by means responsive to mismatching between transmitter output and antenna.

8. A circuit arrangement according to claim 1, comprising a power control stage for connecting the output of the first reversal stage with a counting mechanism.

9. A circuit arrangement according to claim 1, wherein said first named time flip-flop circuit is provided with an auxiliary input, and a test key for connecting a control signal to said auxiliary input.

10. A circuit arrangement according to claim 1, comprising an amplifier stage having an input connected to receive said control signal, and an output to which is connected a control lamp for indicating the blocking of operating voltages.

References Cited

UNITED STATES PATENTS

| | | | |
|---|---|---|---|
| 2,659,008 | 11/1953 | Floyd | 328—8 |
| 2,985,820 | 5/1961 | Schouweiler | 331—62 |
| 3,147,400 | 9/1964 | McClay | 317—22 |

JOHN W. CALDWELL, *Acting Primary Examiner.*

STEPHEN W. CAPELLI, *Examiner.*

B. V. SAFOUREK, *Assistant Examiner.*